(12) United States Patent
Ma et al.

(10) Patent No.: US 9,126,828 B2
(45) Date of Patent: Sep. 8, 2015

(54) MIXED STRUCTURES OF SINGLE WALLED AND MULTI WALLED CARBON NANOTUBES

(75) Inventors: Jun Ma, Lexington, MA (US); Alan Fiseher, Cambridge, MA (US); Robert Hoch, Hensonville, NY (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 156 days.

(21) Appl. No.: 11/841,676

(22) Filed: Aug. 20, 2007

(65) Prior Publication Data

US 2008/0176052 A1 Jul. 24, 2008

Related U.S. Application Data

(63) Continuation of application No. 11/601,073, filed on Nov. 16, 2006.

(60) Provisional application No. 60/737,823, filed on Nov. 16, 2005.

(51) Int. Cl.
| | |
|---|---|
| C01B 31/00 | (2006.01) |
| C01B 31/04 | (2006.01) |
| C01B 31/08 | (2006.01) |
| B82B 1/00 | (2006.01) |
| B82Y 30/00 | (2011.01) |
| B82Y 40/00 | (2011.01) |
| C01B 31/02 | (2006.01) |

(52) U.S. Cl.
CPC . B82B 1/00 (2013.01); B82Y 30/00 (2013.01); B82Y 40/00 (2013.01); C01B 31/0226 (2013.01); C01B 31/0273 (2013.01)

(58) Field of Classification Search
CPC ........ B82Y 30/00; B82Y 40/00; B82Y 10/00; C01B 2202/02; C01B 31/0253; C01B 2202/06; Y10S 977/742; Y10S 977/745; Y10S 977/752; Y10S 977/847
USPC .......... 428/357, 364, 365; 977/745, 742, 748, 977/750, 752, 762; 423/414, 445 B, 445 R, 423/447.1, 447.6, 448, 460
See application file for complete search history.

(56) References Cited

U.S. PATENT DOCUMENTS

| | | |
|---|---|---|
| 4,663,230 A | 5/1987 | Tennent |
| 4,855,091 A | 8/1989 | Geus |
| 5,165,909 A | 11/1992 | Tennent |

(Continued)

OTHER PUBLICATIONS

Iijima, et al., "Single-shell carbon nanotubes of 1-nm," Nature, Vo. 363, Jun. 17, 1993, p. 603-605.*

(Continued)

*Primary Examiner* — Matthew Matzek
(74) *Attorney, Agent, or Firm* — Laura L. Lee

(57) ABSTRACT

The invention relates to carbon nanotube structures containing both single walled and multi walled carbon nanotubes, and methods for preparing same. These carbon nanotube structures include but are not limited to macroscopic two and three dimensional structures of carbon nanotubes such as assemblages, mats, plugs, networks, rigid porous structures, extrudates, etc. The carbon nanotube structures of the present invention have a variety of uses, including but not limited to, porous media for filtration, adsorption, chromatography; electrodes and current collectors for supercapacitors, batteries and fuel cells; catalyst supports, (including electrocatalysis), etc.

15 Claims, 2 Drawing Sheets

(56) References Cited

U.S. PATENT DOCUMENTS

| | | | |
|---|---|---|---|
| 5,171,560 A | 12/1992 | Tennent | |
| 5,424,054 A | 6/1995 | Bethune et al. | |
| 5,456,897 A | 10/1995 | Moy et al. | |
| 5,500,200 A | 3/1996 | Manderville et al. | |
| 5,569,635 A | 10/1996 | Moy et al. | |
| 5,691,054 A * | 11/1997 | Tennent et al. | 428/359 |
| 5,707,916 A | 1/1998 | Snyder et al. | |
| 5,800,706 A | 9/1998 | Fischer | |
| 6,099,965 A * | 8/2000 | Tennent et al. | 428/408 |
| 6,143,689 A * | 11/2000 | Moy et al. | 502/170 |
| 6,203,814 B1 | 3/2001 | Fisher et al. | |
| 6,221,330 B1 | 4/2001 | Moy et al. | |
| 6,333,016 B1 * | 12/2001 | Resasco et al. | 423/447.3 |
| 6,414,836 B1 | 7/2002 | Tennent et al. | |
| 6,495,258 B1 | 12/2002 | Chen et al. | |
| 6,514,897 B1 * | 2/2003 | Moy et al. | 502/174 |
| 6,761,870 B1 | 7/2004 | Smalley et al. | |
| 6,827,919 B1 | 12/2004 | Moy et al. | |
| 7,396,798 B2 | 7/2008 | Ma et al. | |
| 2002/0136681 A1 | 9/2002 | Smalley et al. | |
| 2003/0086858 A1 * | 5/2003 | Niu et al. | 423/447.1 |
| 2003/0198812 A1 * | 10/2003 | Rueckes et al. | 428/408 |
| 2004/0048365 A1 * | 3/2004 | Huie et al. | 435/293.1 |
| 2004/0159833 A1 | 8/2004 | Rueeckes et al. | |
| 2004/0181630 A1 | 9/2004 | Jaiprakash et al. | |
| 2005/0263456 A1 | 12/2005 | Cooper et al. | |
| 2006/0017191 A1 | 1/2006 | Liang et al. | |
| 2006/0054555 A1 * | 3/2006 | Sun | 210/634 |
| 2006/0137817 A1 | 6/2006 | Tennent et al. | |
| 2006/0142149 A1 | 6/2006 | Ma et al. | |
| 2006/0239893 A1 | 10/2006 | Zhang et al. | |
| 2008/0031802 A1 | 2/2008 | Ma et al. | |

OTHER PUBLICATIONS

Dai, H., et al., "Single-wall nanotubes produced by metal-catalyzed disproportionation of carbon monoxide," Chemical Physics Letters, 260: 471-475 (1996).

De Heer, W. A., "Nanotubes and the Pursuit of Applications," MRS Bulletin, pp. 281-285 (2004).

Iijima, S. and Ichihasi, T., "Single-shell carbon nanotubes of 1-nm diameter," Nature, vol. 363, pp. 603-605 (1993).

Kitiyanan, B., et al., "Controlled production of single-wall carbon nanotubes by catalytic decomposition of CO on bimetallic Co—Mo catalysts," Chemical Physics Letters, 317: 497-503 (2000).

Rodriguez, N., "A review of catalytically grown carbon nanofibers," J. Mater. Res., vol. 8, pp. 3233-3250 (1993).

Zhong, D.Y., et al., "Patterned Growth of Coiled Carbon Nanotubes by a Template-assisted Technique", Applied Physics Letters, vol. 83:21, pp. 4423-4425 (2003).

Yao, et al., "Study on Deposition Mechanism of Pt Nano-particles on Carbon Nanotube", Chinese Hournal of Inorganic Chemistry 20(5):1-12 (2004).

* cited by examiner

2A

2B

MIXED STRUCTURES OF SINGLE WALLED AND MULTI WALLED CARBON NANOTUBES

RELATED APPLICATIONS

This application is a continuation of co-pending U.S. application Ser. No. 11/601,073, filed Nov. 16, 2006, which claims the benefit of and priority to U.S. Provisional Application No. 60/737,826, filed Nov. 16, 2005, each of which are hereby incorporated by reference.

BACKGROUND OF THE INVENTION

1. Field of Invention

The invention relates to carbon nanotube structures containing both single walled and multi walled carbon nanotubes, and methods for preparing same. These carbon nanotube structures include but are not limited to macroscopic two and three dimensional structures of carbon nanotubes such as assemblages, mats, plugs, networks, rigid porous structures, extrudates, etc. The carbon nanotube structures of the present invention have a variety of uses, including but not limited to, porous media for filtration, adsorption, chromatography; electrodes and current collectors for supercapacitors, batteries and fuel cells; catalyst supports, (including electrocatalysis), etc.

2. Description of the Related Art

Carbon Nanotubes

This invention lies in the field of submicron graphitic carbon fibrils, commonly referred to as nanotubes. Carbon fibrils are vermicular carbon deposits having diameters less than $1.0\mu$, preferably less than $0.5\mu$, and even more preferably less than $0.2\mu$. Carbon nanotubes can be either multi walled (i.e., have more than one graphene layer more or less parallel to the nanotube axis) or single walled (i.e., have only a single graphene layer parallel to the nanotube axis). Other types of carbon nanotubes are also described below.

The carbon nanotubes which can be treated as taught in this application, are distinguishable from commercially available continuous carbon fibers. In contrast to these fibers which have aspect ratios (L/D) of at least $10^4$ and often $10^6$ or more, carbon fibrils have desirably large, but unavoidably finite, aspect ratios. The diameter of continuous fibers is also far larger than that of fibrils, being always $>1.0\mu$ and typically 5 to $7\mu$.

Carbon nanotubes differ physically and chemically from continuous carbon fibers which are commercially available as reinforcement materials, and from other forms of carbon such as standard graphite and carbon black. Standard graphite, because of its structure, can undergo oxidation to almost complete saturation. Moreover, carbon black is amorphous carbon generally in the form of spheroidal particles having a graphene structure, carbon layers around a disordered nucleus. The differences make graphite and carbon black poor predictors of carbon nanotube chemistry.

Carbon nanotubes exist in a variety of forms and have been prepared through the catalytic decomposition of various carbon-containing gases at metal surfaces. Such vermicular carbon deposits have been observed almost since the advent of electron microscopy. (Baker and Harris, *Chemistry and Physics of Carbon*, Walker and Thrower ed., Vol. 14, 1978, p. 83; Rodriguez, N., *J. Mater. Research*, Vol. 8, p. 3233 (1993)).

In 1976, Endo et al. (see Oberlin, A. and Endo, M., *J. of Crystal Growth*, Vol. 32 (1976), pp. 335-349), hereby incorporated by reference, elucidated the basic mechanism by which such carbon fibrils grow. They were seen to originate from a metal catalyst particle, which, in the presence of a hydrocarbon containing gas, becomes supersaturated in carbon. A cylindrical ordered graphitic core is extruded which immediately, according to Endo et al., becomes coated with an outer layer of pyrolytically deposited graphite. These fibrils with a pyrolytic overcoat typically have diameters in excess of $0.1\mu$, more typically 0.2 to $0.5\mu$.

In 1983, Tennent, U.S. Pat. No. 4,663,230, hereby incorporated by reference, describes carbon fibrils that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than $0.1\mu$ and length to diameter ratios of at least 5. Desirably they are substantially free of a continuous thermal carbon overcoat, i.e., pyrolytically deposited carbon resulting from thermal cracking of the gas feed used to prepare them. Thus, the Tennent invention provided access to smaller diameter fibrils, typically 35 to 700 Å (0.0035 to $0.070\mu$) and to an ordered, "as grown" graphitic surface. Fibrillar carbons of less perfect structure, but also without a pyrolytic carbon outer layer have also been grown.

Tennent, et al., U.S. Pat. No. 5,171,560, hereby incorporated by reference, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than $0.1\mu$ and length to diameter ratio of greater than 5. These fibrils can be oxidized by the methods of the invention.

When the projection of the graphitic layers on the nanotube axis extends for a distance of less than two nanotube diameters, the carbon planes of the graphitic nanotube, in cross section, take on a herring bone appearance. These are termed fishbone fibrils. Geus, U.S. Pat. No. 4,855,091, hereby incorporated by reference, provides a procedure for preparation of fishbone fibrils substantially free of a pyrolytic overcoat. These carbon nanotubes are also useful in the practice of the invention.

Carbon nanotubes of a morphology similar to the catalytically grown fibrils described above have been grown in a high temperature carbon arc (Iijima, Nature 354, 56, 1991). It is now generally accepted (Weaver, Science 265, 1994; de Heer, Walt A., "Nanotubes and the Pursuit of Applications," *MRS Bulletin*, April, 2004, both incorporated by reference herein) that these arc-grown nanofibers have the same morphology as the earlier catalytically grown fibrils of Tennent. Arc grown carbon nanofibers often colloquiolly referred to as "bucky tubes", are also useful in the invention.

Useful single walled carbon nanotubes and process for making them are disclosed, for example, in "Single-shell carbon nanotubes of 1-nm diameter", S Iijima and T Ichihashi *Nature, vol.* 363, p. 603 (1993) and "Cobalt-catalysed growth of carbon nanotubes with single-atomic-layer walls," D S Bethune, C H Kiang, M S DeVries, G Gorman, R Savoy and R Beyers *Nature, vol.* 363, p. 605 (1993), both articles of which are hereby incorporated by reference.

Single walled carbon nanotubes are also disclosed in U.S. Pat. No. 6,221,330 to Moy et. al., the contents therein of which are hereby incorporated by reference. Moy disclosed a process for producing hollow, single-walled carbon nanotubes by catalytic decomposition of one or more gaseous carbon compounds by first forming a gas phase mixture carbon feed stock gas comprising one or more gaseous carbon compounds, each having one to six carbon atoms and only H, O, N, S or Cl as hetero atoms, optionally admixed with hydrogen, and a gas phase metal containing compound which is unstable under reaction conditions for said decomposition, and which forms a metal containing catalyst which acts as a decomposition catalyst under reaction conditions; and then conducting said decomposition reaction under decomposition reaction conditions, thereby producing said nanotubes. The invention relates to a gas phase reaction in which a gas phase metal containing compound is introduced into a reaction mixture also containing a gaseous carbon source. The carbon source is typically a $C_1$ through $C_6$ compound having as hetero atoms H, O, N, S or Cl, optionally mixed with hydrogen. Carbon monoxide or carbon monoxide and hydrogen is a preferred carbon feedstock. Increased reaction zone temperatures of approximately 400° C. to 1300° C. and pressures of between about 0 and about 100 p.s.i.g., are believed to cause decomposition of the gas phase metal containing compound to a metal containing catalyst. Decomposition may be to the atomic metal or to a partially decomposed intermediate species. The metal containing catalysts (1) catalyze CO decomposition and (2) catalyze SWNT formation.

The invention of U.S. Pat. No. 6,221,330 may in some embodiments employ an aerosol technique in which aerosols of metal containing catalysts are introduced into the reaction mixture. An advantage of an aerosol method for producing SWNT is that it will be possible to produce catalyst particles of uniform size and scale such a method for efficient and continuous commercial or industrial production. The previously discussed electric arc discharge and laser deposition methods cannot economically be scaled up for such commercial or industrial production. Examples of metal containing compounds useful in the invention include metal carbonyls, metal acetyl acetonates, and other materials which under decomposition conditions can be introduced as a vapor which decomposes to form an unsupported metal catalyst. Catalytically active metals include Fe, Co, Mn, Ni and Mo. Molybdenum carbonyls and iron carbonyls are the preferred metal containing compounds which can be decomposed under reaction conditions to form vapor phase catalyst. Solid forms of these metal carbonyls may be delivered to a pretreatment zone where they are vaporized, thereby becoming the vapor phase precursor of the catalyst. It was found that two methods may be employed to form SWNT on unsupported catalysts.

The first method is the direct injection of volatile catalyst. Direct injection of volatile catalyst precursors has been found to result in the formation of SWNT using molybdenum hexacarbonyl [Mo(CO)$_6$] and dicobalt octacarbonyl [Co$_2$(CO)$_8$] catalysts. Both materials are solids at room temperature, but sublime at ambient or near-ambient temperatures— the molybdenum compound is thermally stable to at least 1500, the cobalt compound sublimes with decomposition "Organic Syntheses via Metal Carbonyls," Vol. 1, I. Wender and P. Pino, eds., Interscience Publishers, New York, 1968, p. 40).

The second method described in U.S. Pat. No. 6,221,330 uses a vaporizer to introduce the metal containing compound (see FIG. 1 in U.S. Pat. No. 6,221,330). In one preferred embodiment of the invention, the vaporizer 10, shown at FIG. 2 of U.S. Pat. No. 6,221,330, comprises a quartz thermowell 20 having a seal 24 about 1" from its bottom to form a second compartment. This compartment has two ¼" holes 26 which are open and exposed to the reactant gases. The catalyst is placed into this compartment, and then vaporized at any desired temperature using a vaporizer furnace 32. This furnace is controlled using a first thermocouple 22. A metal containing compound, preferably a metal carbonyl, is vaporized at a temperature below its decomposition point, reactant gases CO or CO/H$_2$ sweep the precursor into the reaction zone 34, which is controlled separately by a reaction zone furnace 38 and second thermocouple 42. Although applicants do not wish to be limited to a particular theory of operability, it is believed that at the reactor temperature, the metal containing compound is decomposed either partially to an intermediate species or completely to metal atoms. These intermediate species and/or metal atoms coalesce to larger aggregate particles which are the actual catalyst. The particle then grows to the correct size to both catalyze the decomposition of CO and promote SWNT growth. In the apparatus of FIG. 1 of U.S. Pat. No. 6,221,330, the catalyst particles and the resultant carbon forms are collected on the quartz wool plug 36. Rate of growth of the particles depends on the concentration of the gas phase metal containing intermediate species. This concentration is determined by the vapor pressure (and therefore the temperature) in the vaporizer. If the concentration is too high, particle growth is too rapid, and structures other than SWNT are grown (e.g., MWNT, amorphous carbon, onions, etc.) All of the contents of U.S. Pat. No. 6,221,330, including the Examples described therein, are hereby incorporated by reference.

U.S. Pat. No. 5,424,054 to Bethune et al., hereby incorporated by reference, describes a process for producing single-walled carbon nanotubes by contacting carbon vapor with cobalt catalyst. The carbon vapor is produced by electric arc heating of solid carbon, which can be amorphous carbon, graphite, activated or decolorizing carbon or mixtures thereof. Other techniques of carbon heating are discussed, for instance laser heating, electron beam heating and RF induction heating.

Smalley (Guo, T., Nikoleev, P., Thess, A., Colbert, D. T., and Smally, R. E., Chem. Phys. Lett. 243: 1-12 (1995)), hereby incorporated by reference, describes a method of producing single-walled carbon nanotubes wherein graphite rods and a transition metal are simultaneously vaporized by a high-temperature laser.

Smalley (Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996)), hereby incorporated by reference, also describes a process for production of single-walled carbon nanotubes in which a graphite rod containing a small amount of transition metal is laser vaporized in an oven at about 1200° C. Single-wall nanotubes were reported to be produced in yields of more than 70%.

Supported metal catalysts for formation of SWNT are also known. Smalley (Dai., H., Rinzler, A. G., Nikolaev, P., Thess, A., Colbert, D. T., and Smalley, R. E., Chem. Phys. Lett. 260: 471-475 (1996)), hereby incorporated by reference, describes supported Co, Ni and Mo catalysts for growth of both multi-walled nanotubes and single-walled nanotubes from CO, and a proposed mechanism for their formation.

U.S. Pat. No. 6,761,870 (also WO 00/26138) to Smalley, et. al, hereby incorporated by reference, discloses a process of supplying high pressure (e.g., 30 atmospheres) CO that has been preheated (e.g., to about 1000° C.) and a catalyst precursor gas (e.g., Fe(CO)$_5$) in CO that is kept below the catalyst precursor decomposition temperature to a mixing zone. In this mixing zone, the catalyst precursor is rapidly heated to a temperature that is reported to result in (1) precursor decomposition, (2) formation of active catalyst metal atom clusters of the appropriate size, and (3) favorable growth of SWNTs on the catalyst clusters.

Other methods of producing carbon nanotubes are disclosed in Resasco, et al., "Controlled production of single-wall carbon nanotubes by catalytic decomposition of CO on bimetallic Co—Mo catalysts," *Chemical Physics Letters*, 317 (2000) 497-503 and U.S. Pat. No. 6,333,016 to Resasco, et. all, both of which are hereby incorporated by reference. The carbon nanotubes are produced therein by contacting a carbon containing gas with metallic catalytic particles.

Additional methods of producing single walled carbon nanotubes are disclosed in U.S. Ser. No. 11/281,571, Zhang, et. al, "Methods For Producing Single Walled Carbon Nanotubes," filed Nov. 16, 2005 and its parent application U.S. Provisional Application No. 60/630,946, filed Nov. 24, 2004, U.S. Provisional Application No. 60/630,781, filed Nov. 24, 2004 and U.S. Provisional Application No. 60/628,498, filed Nov. 16, 2004. All of these references are hereby incorporated by reference in their entirety.

Aggregates of Carbon Nanotubes and Assemblages

As produced, carbon nanotubes may be in the form of discrete nanotubes, aggregates of nanotubes or both.

Nanotubes are prepared as aggregates having various morphologies (as determined by scanning electron microscopy) in which they are randomly entangled with each other to form entangled balls of nanotubes resembling bird nests ("BN"); or as aggregates consisting of bundles of straight to slightly bent or kinked carbon nanotubes having substantially the same relative orientation, and having the appearance of combed yarn ("CY") e.g., the longitudinal axis of each nanotube (despite individual bends or kinks) extends in the same direction as that of the surrounding nanotubes in the bundles; or, as, aggregates consisting of straight to slightly bent or kinked nanotubes which are loosely entangled with each other to form an "open net" ("ON") structure. In open net structures the extent of nanotube entanglement is greater than observed in the combed yarn aggregates (in which the individual nanotubes have substantially the same relative orientation) but less than that of bird nest. Other useful aggregate structures include the cotton candy ("CC") structure.

The morphology of the aggregate is controlled by the choice of catalyst support. Spherical supports grow nanotubes in all directions leading to the formation of bird nest aggregates. Combed yarn and open net aggregates are prepared using supports having one or more readily cleavable planar surfaces, e.g., an iron or iron-containing metal catalyst particle deposited on a support material having one or more readily cleavable surfaces and a surface area of at least 1 square meters per gram. U.S. Pat. No. 6,143,689 to Moy et al., entitled "Improved Methods and Catalysts for the Manufacture of Carbon Fibrils", filed Jun. 6, 1995, hereby incorporated by reference, describes nanotubes prepared as aggregates having various morphologies (as determined by scanning electron microscopy).

Further details regarding the formation of carbon nanotube aggregates may be found in the disclosure of U.S. Pat. No. 5,165,909 to Tennent; U.S. Pat. No. 5,456,897 to Moy et al.; Snyder et al., U.S. Pat. No. 5,707,916, filed May 1, 1991, and PCT Application No. US89/00322, filed Jan. 28, 1989 ("Carbon Fibrils") WO 89/07163, and Moy et al., U.S. Pat. No. 5,456,897 filed Aug. 2, 1994 and PCT Application No. US90/05498, filed Sep. 27, 1990 ("Battery") WO 91/05089, and U.S. Pat. No. 5,500,200 to Mandeville et al., filed Jun. 7, 1995, 1994 and U.S. Pat. No. 5,569,635 filed Oct. 11, 1994 by Moy et al., all of which are assigned to the same assignee as the invention here and are hereby incorporated by reference.

Carbon Nanotube Structures

Carbon nanotube structures include assemblages, mats, plugs, networks, rigid porous structures, extrudates, etc.

Assemblages are carbon nanotube structures which have relatively uniform properties in along one, preferably two and most desirably three dimensional axis of the three dimensional assemblage. (E.g., U.S. Pat. No. 5,691,054 hereby incorporated by reference). Two dimensionally uniform assemblages take the form of mats. Three dimensionally uniform assemblages may take the form of the container in which they are formed and are typically called plugs. Multi walled carbon nanotube mats may have a thickness between 0.02 and 0.50 millimeters and a density of approximately 0.20 g/cc. Generally, assemblages are formed by de-aggregating the carbon nanotube aggregate structure, and then reassembling them to form assemblages. Multi walled carbon nanotube assemblages may have a bulk density of from 0.001 to 0.50 gm/cc and at least two dimensions greater than about 0.02 mm. Assemblages may also have at least two dimensions greater than 0.2 mm.

Networks are formed by linking individual functionalized carbon nanotubes together by using a linking molecule between the functionalized groups located on the surface of the carbon nanotubes. (E.g., PCT/US97/03553 or WO 97/32571, hereby incorporated by reference). In general a matlike or pluglike network may have a lower density than the corresponding assemblage, but still within the range of 0.001 to 0.50 g/cc.

Rigid porous structures are formed by either linking the individual functionalized carbon nanotubes in an assemblage together without the use of a linking molecule, or by gluing carbon nanotube aggregate structures together with a gluing agent. (E.g., U.S. Pat. No. 6,099,965, hereby incorporated by reference).

Rigid porous structures of multi walled carbon nanotubes may have a surface area greater than about 100 $m^2$/gm, may be substantially free of micropores and may have a crush strength greater than about 2 lb/$in^2$. Rigid porous structures may even have surface area greater than 200 $m^3$/$gm^2$. Rigid porous structures of multi walled carbon nanotubes may have densities greater than density greater than 0.8 g/$cm^3$. U.S. Pat. No. 6,099,965, which is incorporated by reference above, provides examples of rigid porous structures, for example, Example 5 describes a sample made from "as is" nanotube aggregates using phenolic resin/Polyethylene Glycol (PEG)/Glyccerine to hold the aggregates together. The partially dried slurry was pressed and cut into pellets, which can be pyrolized to remove PEG/Glycerine and convert the phenolic resin to carbon with a surface area of 351 $m^2$/g. See page 23, lines 40-60.

Single walled carbon nanotubes typically have smaller diameter than most multi walled carbon nanotubes. Thus, structures created from single walled carbon nanotubes ("single walled carbon nanotube structures) will have significantly greater specific surface area (sqm/gm) and lower density than structures created from multi-walled carbon nanotubes ("multi walled carbon nanotube structures"). Surface area can be a critical performance parameter for many applications that use carbon nanotubes structures, such as those listed in this application.

Additionally, single walled carbon nanotube structures can have smaller effective pore size than multi walled carbon nanotube structures. Having smaller effective pore size may be beneficial in many applications, and undesirable in other circumstances. For example, smaller pores result in catalyst supports having higher specific surface. Conversely, smaller pores are subject to diffusion limitations and plugging. Thus, the advantages of smaller pore size need to be balanced against other considerations. Parameters, like total porosity, pore size distribution, etc. become important qualifiers of effective pore size. Thus while multi walled carbon nanotube assemblages, networks, rigid porous structures and extrudates have specific surface areas between 30 and 600 sqm/gm, the corresponding single walled assemblages, networks, structures and extrudates have specific surface areas between 1000 and 2500 sqm/gm.

Generally, single walled carbon nanotubes are more expensive and less pure than multi walled carbon nanotubes, and are harder to disperse and more difficult to functionalize. As such, multi walled carbon nanotube structures are easier to prepare.

As such, there is a need for a carbon nanotube structure that contains the benefits offered by both single walled and multi walled carbon nanotubes.

SUMMARY OF THE INVENTION

The present invention provides carbon nanotube structures containing a mixture of both single walled and multi walled carbon nanotubes.

These carbon nanotube structures include but are not limited to macroscopic two and three dimensional structures of carbon nanotubes such as assemblages, mats, plugs, networks, rigid porous structures, extrudates, etc.

The carbon nanotube structures of the present invention have a variety of uses, including but not limited to, porous media for filtration, adsorption, chromatography; electrodes and current collectors for supercapacitors, batteries and fuel cells; catalyst supports, (including electrocatalysis), etc.

The present invention also provides new methods for creating carbon nanotube structures which contain a mixture of both single walled and multi walled carbon nanotubes.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE PREFERRED EMBODIMENTS

Definitions

Figure 1:
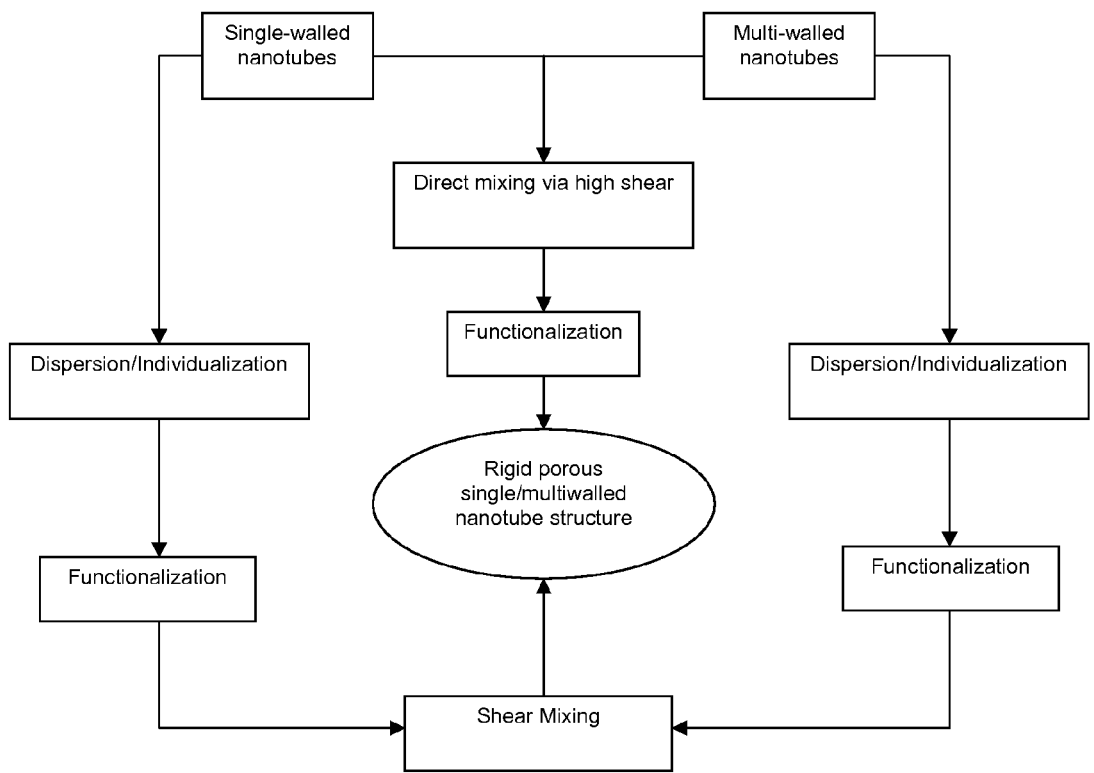
FIG. 1 illustrates a schematic diagram of various methods which can be used in an exemplary embodiment to form mixed structure of single-walled and multi-walled carbon nanotubes.

The terms "nanotube", "nanofiber" and "fibril" are used interchangeably to refer to single walled or multiwalled carbon nanotubes. Each refers to an elongated structure preferably having a cross section (e.g., angular fibers having edges) or a diameter (e.g., rounded) less than 1 micron (for multi-walled nanotubes) or less than 5 nm (for single walled nanotubes). The term "nanotube" also includes "buckytubes", and fishbone fibrils.

"Multiwalled nanotubes" as used herein refers to carbon nanotubes which are substantially cylindrical, graphitic nanotubes of substantially constant diameter and comprise cylindrical graphitic sheets or layers whose c-axes are substantially perpendicular to the cylindrical axis, such as those described, e.g., in U.S. Pat. No. 5,171,560 to Tennent, et al.

"Single walled nanotubes" as used herein refers to carbon nanotubes which are substantially cylindrical, graphitic nanotubes of substantially constant diameter and comprise a single cylindrical graphitic sheet or layer whose c-axis is substantially perpendicular to their cylindrical axis, such as those described, e.g., in U.S. Pat. No. 6,221,330 to Moy, et al. Single walled carbon nanotubes may also be referred to as "SWTs" or "SWNTs".

The term "functional group" refers to groups of atoms that give the compound or substance to which they are linked characteristic chemical and physical properties.

A "functionalized" surface refers to a carbon surface on which chemical groups are adsorbed or chemically attached.

"Graphenic" carbon is a form of carbon whose carbon atoms are each linked to three other carbon atoms in an essentially planar layer forming hexagonal fused rings. The layers are platelets only a few rings in diameter or they may be ribbons, many rings long but only a few rings wide.

"Graphitic" carbon consists of graphenic layers which are essentially parallel to one another and no more than 3.6 angstroms apart.

The term "aggregate" refers to a dense, microscopic particulate structure comprising entangled carbon nanotubes.

The term "micropore" refers to a pore which has a diameter of less than 2 nanometers.

The term "mesopore" refers to pores having a cross section greater than 2 nanometers and less than 50 nanometers.

The term "surface area" refers to the total surface area of a substance measurable by the BET technique.

The term "accessible surface area" refers to that surface area not attributed to micropores (i.e., pores having diameters or cross-sections less than 2 nm).

The term "isotropic" means that all measurements of a physical property within a plane or volume of the structure, independent of the direction of the measurement, are of a constant value. It is understood that measurements of such non-solid compositions must be taken on a representative sample of the structure so that the average value of the void spaces is taken into account.

The term "untreated" when used in comparison to "ozone treated" carbon nanotubes, aggregates or any other carbon nanotube structures mean that that the carbon nanotubes, aggregates, or structures have not been specifically treated with ozone. It does not preclude carbon nanotubes, aggregates, or structures which have been subjected to other non-ozone treatments before the treatment with ozone.

Structures Containing Mixture of Carbon Nanotubes

The present invention solves the deficiencies of prior carbon nanotube structures by containing both single walled and multi walled carbon nanotubes. Carbon nanotube structures comprising both multi walled and single walled carbon nanotubes can retain the high specific surface area and small effective pore size associated with single walled carbon nanotubes while retaining substantial macroporosity associated with multi walled carbon nanotubes. Multi walled carbon nanotubes also come with a lower cost, and are easier to disperse and functionalize into a carbon nanotube structure.

In an exemplary embodiment, a carbon nanotube structure of the present invention contains multi walled carbon nanotubes to provide the integrity and physical conformation of the structure, and single walled carbon nanotubes to provide the effective surface area. These structures may exhibit a bimodal pore size distribution.

The mixed structures have densities between 0.001 and 0.50 g/mL, preferably between 0.05-0.5 g/mL. The mixed structure have surface areas between 300-1800 sqm/g, preferably between 500-1000 sqm/g.

The ratio of single walled carbon nanotubes to multi walled carbon nanotubes in the carbon nanotube structure may range from 1/1000 to 1000/1 by weight, or 1/100 to 100/1, or 1/10 to 10/1.

Preferably, the ratio of single walled carbon nanotubes to multi walled carbon nanotubes in the carbon nanotube structure may range from 1/1000 to 100/1 by weight, or 1/10 to 100/1. The ratio of single walled carbon nanotubes to multi walled carbon nanotubes in the carbon nanotube structure may further range from 1/1000 to 10/1 by weight, or 1/100 to 10/1.

More preferably, the ratio of single walled carbon nanotubes to multi walled carbon nanotubes in the carbon nanotube structure range from 1/1000 to 1/1 by weight, or 1/100 to 1/1, or 1/10 to 1/1. Alternatively, the ratio of single walled carbon nanotubes to multi walled carbon nanotubes in the carbon nanotube structure may range from 1/1 to 1000/1 by weight, or 1/1 to 100/1, or 1/1 to 10/1.

Methods of Preparing Carbon Nanotube Structures

The following U.S. patents are hereby incorporated by reference: U.S. Pat. Nos. 6,203,814, 6,099,965, 6,414,836. Thus, all of teachings in those patents are considered as part of the instant specification. Similarly, the following U.S. Applications filed concurrently on Nov. 16, 2005 are also all hereby incorporated by reference: U.S. Ser. No. 11/281,814, titled "Methods For Preparing Supported Catalysts From Metal Loaded Carbon Nanotubes"; U.S. Ser. No. 11/281,575, titled, "Method For Preparing Catalyst Supports And Supported Catalysts From Single Walled Carbon Nanotubes"; and U.S. Ser. No. 11/281,571, titled, "Method For Preparing Single Walled Carbon Nanotubes." Thus, all of these applications are also considered part of the instant specification.

In an exemplary embodiment, a carbon nanotube structure is prepared by first dispersing single walled carbon nanotubes aggregates (i.e, disaggregate them into individual tubes if necessary), then adding multi walled carbon nanotubes (also disaggregated into individual tubes if necessary) so as to mix with the single walled carbon nanotubes, and then forming a carbon nanotube structure from the mixture.

In another exemplary embodiment, a three dimensional interpenetrating structure is made via in-situ growth of single-walled nanotubes on the surface of dispersed multi walled nanotube supported catalyst. For example, a highly dispersed Mo carbide catalyst supported on carbon nanotubes have been disclosed in U.S. Pat. No. 6,514,897, herein incorporated by reference. Co catalyst can then be deposited on the surface of Mo carbide nanoparticles to construct a catalyst effective for growing single walled carbon nanotubes when exposed to carbon containing reactants at elevated temperatures. On the other hand, metals such as Fe, Co and Ni can be deposited on the surface of single-walled with controlled sizes capable to grow multiwalled nanotubes.

Alternatively, metals such as Fe, Co and Ni with controlled sizes capable to grow multiwalled nanotubes can be deposited on the surface of single-walled carbon nanotubes.

Conveniently, the multi walled carbon nanotubes are functionalized and form the structure via the self reaction of functionalized tubes. Preferably, the multi walled and single walled carbon nanotubes are separately produced and may be separately pretreated before assembling the mixed structure. For example, the multi walled carbon nanotubes may be pre-oxidized so that they can be cross linked and the single walled carbon nanotubes may be pre-loaded with catalyst or catalyst precursor before assembling a supported catalyst structure.

In yet another exemplary embodiment, mixtures of multi walled and single walled carbon nanotubes can be used to form the carbon nanotube structures of the present invention. For example a mixture of multi walled carbon nanotubes and single walled carbon nanotubes can be treated with functionalization reagents specific to the multi walled carbon nanotubes. Such a mixture of single and multiwall carbon nanotubes may be formed concomitantly by catalytic growth.

Individualized single walled carbon nanotubes generally need to be stabilized by surfactants to avoid reflocculation after dispersion. The multi walled carbon nanotubes can act as a "blocking agent" aiding in preventing such reflocculation. The mixed tubes can then be assembled into a structure, for example by filtration or extrusion. Subsequent heat treatment would cross link the multi walled carbon nanotubes and lock the single walled carbon nanotubes inside the structure where they would provide high specific surface.

Dispersion of single walled carbon nanotubes can be carried out in polymer, surfactant, micelles and DNA. In polymer, single walled and multi walled carbon nanotubes can be dispersed via shear generated during melt-processing in a twin screw compounder. On the other hand, liquid processing of single walled carbon nanotubes can also be carried out in polymer, surfactant or micelle to achieve high dispersion before blending with functionalized multiwalled tubes. Single walled carbon nanotubes can be extracted and dispersed in a biological process. DNA-wrapped single walled carbon nanotubes present very high dispersion and purity and can be selectively deposited on a prefunctionalized multi-walled tubes.

All combinations of separate and joint dispersion of single walled and multi walled carbon nanotubes, combined with and independent of functionalization are contemplated and included in the scope of the present invention. In an exemplary embodiment, FIG. 1 provides an illustrative schematic diagram of the various methods which can be used to prepare a rigid porous single/multi-walled carbon nanotube structure.

In yet another exemplary embodiment, a carbon nanotube structure of the present invention is prepared by first creating the structure out of multi walled carbon nanotubes and then use its porosity to capture the single walled carbon nanotubes, for example by flowing a dispersion of single walled carbon nanotubes (appropriately stabilized by surfactant) through the multi walled carbon nanotube structure. The porosity of the multi walled carbon nanotube structure, acting as a depth filter, would capture the single walled carbon nanotubes, leading to a mixed structure of high specific area. Optionally the single walled carbon nanotubes may be functionalized or otherwise pretreated before being captured by the multi walled carbon nanotube structure. In this embodiment, the multi walled carbon nanotube structure can be easily created out of non-functionalized multi walled carbon nanotubes using a binder. Alternatively a binder with affinity for multi walled carbon nanotubes can be used and the mixed structure assembled out of a mixture of multi walled carbon nanotubes and single walled carbon nanotubes.

EXAMPLES

Example 1

5 grams of single-walled carbon nanotubes (SWNT) made by the method described in U.S. Pat. Nos. 6,827,919 and 15 grams of "CC" type multi-walled nanotubes (MWNT) are mixed with 80 grams of polyvinyl chloride in a lab scale twin-screw extrudate at 250° C. and followed by extrusion. The composite can be digested with γ-butyrolactone to remove all polymer content and the resulting suspension is filtered and calcined at 400° C. in argon in order to form rigid porous structure containing 25% single-walled and 75% multi-walled nanotubes.

Example 2

0.1 gram of single-wall and 0.4 gram of CC nanotubes are placed in a 100-mL beaker. 100 grams of isopropanol is then added to the mixture. The mixture is then treated with probe sonicator for 4 hours till forming stable suspension of mostly individualized nanotubes. Then the suspension can be filtered and form a nanotube mat with mixture of single-walled and multi-walled carbon nanotubes (20/80).

Example 3

20 gram of carbon nanotubes (CC type) was placed in a 1-liter round bottom flask and 600 mL concentrated nitric acid (63%) was added to the flask and the temperature was brought up to the reflux condition. The reaction was allowed to proceed for 2 hours and then the system was cooled down to room temperature. The product was subsequently washed thoroughly with deionized water till neutral during filtration. The wet filter cake (Sample A) was set aside for further process.

Example 4

2 grams of Single-walled nanotubes made from a method described in U.S. Pat. No. 6,827,919 are first treated with 20% HCl to remove any residual metal catalysts responsible for making such material. The treated material is captured on a filter and washed thoroughly with deionized water until the filtrate is in neutral pH. The washed nanotubes are then suspended in 2 liter 1 wt. % aqueous solution of sodium dodecylsulfate (SDS) and subjected to high shear using a probe sonicator for four hours to generate mostly individualized single-walled nanotubes. The suspension (Sample B) is set aside for further process.

Example 5

The oxidized MWNTs (Sample A) are re-suspended in deionized water to a level of 0.05 wt % and subjected to high shear using a probe sonicator for 1 hour to generate mostly individualized multi-walled nanotubes (Sample C).

In a separate vessel, a dispersion of SWNTs as described as Sample B of Example 4 is prepared. To this dispersion of SWNTs is added the oxidized MWNTs, Sample C, and mixed with a Waring blender. The resulting slurry is further subjected to continuous high shear mixing using a probe sonicator for 1 hour to form interpenetrated single-wall and multi-walled nanotube network. The mixture is then concentrated by centrifugation followed by filtration to about 5% total solids. The resulting paste like material in the filter cake is blended in a Retsch mortar mill to a uniform consistency after which it is extruded through a die with a circular aperture forming a strand. The stand is cut to shorter lengths and dried at 200° C. in air overnight after which it is calcined at 600° C. in an argon atmosphere for 6 hours to produce rigid particles containing interpenetrating single and multi-walled nanotubes. Ratios of SWNT to MWNT can be controlled by volume of Sample B to C.

Example 6

Dry single-walled carbon nanotubes are subject to ozone treatment using the method disclosed in a U.S. Provisional Application 60/621,132, filed Oct. 22, 2004, where functional groups such as carboxyls, hydroxyls, carbonyls, and lactones are more effectively produced on the surface of nanotubes. Ozone is generated via an air purifier made by Del Industry, San Luis Obispo, Calif., which can generate ozone at a rate of 250 mg/hr. A mixture of ozone and air (0.29% ozone) at a flow rate of 1200 mL/min is then passed though a 1-inch (OD) reactor tube packed with dry as-made single-walled nanotubes. The weight of nanotubes before and after ozone treatment are recorded. The reaction is allowed to proceed for a period of 3 to 45 hours at room temperature. The relative amount of acidic groups on the treated sample are measured through titration. 0.25 gram of the sample is placed into a flask containing 300 mL D.I. water and the slurry is titrated with 0.1N NaOH. The consumption of NaOH is translated into the quantity of total surface acidic groups as meq/g. A titer of 2 meq/g is obtained.

Example 7

Ozone-treated SWNTs made in Example 6 are individualized using the procedure described in Example 4 to give Sample D. Rigid porous structure of SWNTs and MWNTs can be prepared using Sample C and D as described in Example 5.

Example 8

A nanotube mat made of multiwall carbon nanotubes is made by filtration of Sample C followed by cross-linking in argon at 240° C. The as-made mat can be used as a trapping medium for collecting single-walled carbon nanotubes. The dispersed single-walled carbon nanotube sample (Sample B) from Example 4 is poured onto the mat placed on a Buchner funnel. The ratio of SWNTs to MWNTs can be controlled by the volume of Sample B and the weight of mat.

Example 9

A filtering device is set up so both suspension of SWNTs (Sample B) and MWNTs (Sample C) are added to the filter funnel simultaneously. The addition rate is controlled at the ratio of MWNTs to SWNTs at desired value, e.g 1/1 or 5/1, etc. The filtered cake is then freeze-dried at −78° C. The resulting felt contains uniformly distributed single-wall and multiwall nanotubes but has less mechanical strength as compared the product made in Example 5.

Example 10

Similar procedure as described in Example 9 is applied but instead, the suspensions of SWNT (Sample B) and MWNT (Sample C) are added to the filter funnel sequentially.

Example 11

Interlock between SWNT-MWNT as well as SWNT-SWNT and MWNT-MWNT can be established via cross-linking of surface oxygenated groups such as carboxyls, hydroxyls, etc. carried out by calcination in inert environment such as argon. The calcination temperature is usually selected between 240° C. and 600° C. Calcined structures exhibit rigid porous nature of multi-walled nanotubes while maintaining high surface area of single-walled nanotubes, e.g. 1000 m$^2$/g. Alternatively, residues from carbonizable polymer upon calcination, such as polyvinyl chloride, acrylic polymer, phenolic resin, etc., can also be applied to generate such structure.

Example 12

Sample D is further subject to an 8-h reflux with $K_2PtCl_4$ in dilute ethylene glycol (3:2 by volume of ethylene glycol to deionized $H_2O$) at 120-130° C. to allow deposition of Pt particles onto the single-walled nanotubes. Approximately 1.5 mg of $K_2PtCl_4$ and 20 mL of diluted ethylene glycol are added per 10 mg of ozone-treated single-walled nanotubes. The product (Pt-loaded SWNT bundles) is then cooled, centrifuged, washed with deionized water made slightly acidic with a few drops of HCl (a nonoxidizing acid to destabilize the suspension). Typical metal loading of the final material is 10 wt % Pt on SWNTs (Sample E). Deionized water is then added to Sample E to form a uniform suspension and mixed with Sample C made in Example 5 under sonication. Finally, the resulting suspension is concentrated using a rotary evaporator, filtered, dried at 120° C. and calcined in argon at 500° C. to form a rigid porous structure via cross-linking. The final product is composed of small bundles of single-walled nanotube loaded with 1-2 nm Pt particles locked within a rigid, porous structure formed of multi-walled nanotubes.

Example 13

The Sample made from Example 5 contains interpenetrated single and multi-walled nanotubes with the multi-walled nanotube having primarily hydrophilic surface and the single-walled nanotubes having predominantly hydrophobic surfaces. An amphiphilic block copolymer poly(styrene-block-acrylic acid) (PS-b-PAA) is then dissolved in dimethylformamide, a solvent in which both blocks are well solvated and micelles do not form. With gradual addition of a second solvent such as toluene, the solution forms micelles with quasi-hexagonal arrays of PAA spheres within in a PS matrix. The carboxylic acids groups in the PAA domains can be utilized in an ion-exchange protocol to selectively seize Pd ions. Aqueous solution of $Pd(NO_3)_2$ is added to PS-b-PAA micelles with continuous agitation for 6 hours to allow sufficient ionic exchange. The metal loaded micelles are then blended with the same made from Example 5. After filtration, drying at 120° C. and calcined in argon at 300° C., the sample is further subject to reduction in $H_2$ at 300° C. for 1 hour. The product, Sample F, shows a metal dispersion of 50% at catalyst loading of 5% with Pd particles preferentially supported on individualized single-walled nanotubes, which are further locked inside a rigid porous structured multi-walled nanotubes.

Example 14

Examples 1-7 are repeated with SWNTs obtained from Thomas Swan, Ltd. These are believed to be purified tubes grown from a supported catalyst. Results similar to those above are obtained.

Example 15

A Co—Mo/MgO catalyst was prepared via co-precipitation of Co nitrate and Mg nitrate. 0.116 g of $Co(NO_3).6H_2O$ and 2.175 g of $Mg(NO_3)_2.6H_2O$ were dissolved in 23 mL deionized water in a 100-mL beaker. The molar ratio of Co/Mg was 1/20. 20 g of 0.1% Ammonium hepta-molybdate solution was then added into the mixed solution of $Co(NO_3)_2$ & $Mg(NO_3)_2$ and the solution was kept under constant agitation. Approximately 3 g of 30% $NH_4OH$ was then added to precipitate Co and Mg concurrently. The resultant suspension was finally filtered, washed with acetone and dried at 100° C. in air. Approximate Mo loading of ~2.8% was taken into account at this point. 10 mg of this catalyst was then placed in a 1-inch quartz reactor tube. Under 200 mL/min flow of argon, the temperature was raised to 700° C. and the gas flow was switched to ethylene/hydrogen (ratio of 1/4) at 600 mL/min. The reaction was allowed to proceed for just 1-2 minutes before the gas flow was switched back to argon and the system was cooled down to room temperature. In another set of experiment, immediately after the reaction, the reactant gas was switched to argon for 5 minutes with the temperature raised to 800° C. simultaneously. Carbon monoxide was used as the reagent subsequently for growing single-walled carbon nanotubes. The flow of CO was controlled at 500 mL/min. After 15 minutes, the reaction was shut down by replacing CO with argon.

Figure 2:
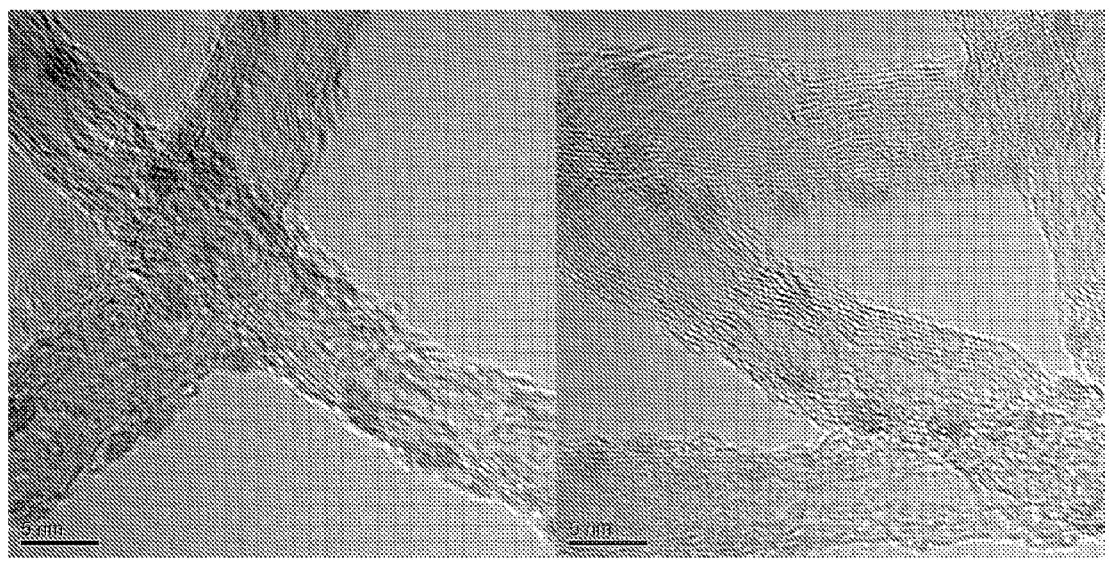
FIG. 2, which is comprised of FIGS. 2A and 2B, provides transmission electron micrographs of carbon nanotubes in various stages in accordance with Example 15.
Figure 2:

Transmission electron microscope was used to examine the products and the representative images were shown in FIG. 2. FIG. 2A showed the product after a catalyst exposed to ethylene and hydrogen at 700° C. for a short period of time, e.g. 2 minutes. Metal nanoparticles of 1-1.5 nm were observed coated on the surface of multi-walled nanotubes with diameter of approximately 10 nm. FIG. 2B showed that, without being exposed to air, the in-situ formed metal nanoparticles supported on multi-walled carbon nanotubes can further grow single-walled carbon nanotubes of 1-1.5 nm. That is, FIG. 2B showed the product after reaction with CO at 800° C. for 15 minutes immediately after 2A. These tubes are either in the form of small bundles containing three to five tubes or individualized as single tubes.

Therefore, after a short period of reaction under conditions suitable for making multi-walled carbon nanotubes, it was observed that multi-walled nanotubes has already formed a three dimension network with metal nanoparticles of approximately 1 nm size coated on their surface. Subsequently contacting carbonaceous reactant under conditions ripe for single-walled nanotube formation, these in-situ generated metal catalyst nanoparticles can further generate single-wall nanotubes, which are mostly in the form of thin bundles (3-4 tubes) or individualized. The composition of nanotube mixture can be easily controlled by altering the duration of two separate reactions.

Example 16

SWNT-growing catalyst can also be pre-deposited on MWNTs (CC-type) ex-situ. Carbon nanotube-supported $MoO_3$ and $Mo_2C$ nanoparticles can be prepared using the procedure described in U.S. Pat. No. 6,514,897. A sample of these materials is prepared with initial C/Mo ratio of 20. Iron, cobalt species or combination thereof is then added to this sample via impregnation of metal nitrate aqueous solution with desired concentration. In a typical experiment, 0.674 gram of $Fe(NO_3)_3.9H_2O$ and 0.485 gram of $Co(NO_3)_2.6H_2O$ are added to 5 gram of the $Mo_2C$/MWNT sample followed by calcination in air at 250° C. 10 mg of this catalyst is then placed in 1-inch quartz reactor tube. The reactor is then heated up quickly under flow of argon till 800° C. The gas flow is then switched to CO at 500 mL/min and the reaction is allowed to proceed for 30 minutes. The products is shown by TEM to have single-walled nanotubes inter-woven inside multi-walled nanotube network.

Example 17

A slurry of the 20 grams of ozone-treated SWNTs from Example 6, 8 grams of a gamma alumina (available from Degussa as Oxide C) and 100-mL of deionized water was made up in a multi-neck, 250 mL indented flask with rapid stirring. The pH of the slurry was adjusted to 6.0. A solution I was made by mixing 0.52 g of ammonium molybdate $[(NH_4)_6Mo_7O_{24}.4H_2O]$, dissolved in 5 mL of deionized water and 1.5 grams of 41% ferric nitrate $[Fe(NO_3)_3]$ solution (9.5% Fe). Solution I and a 20% by weight ammonium carbonate solution (Solution II) were added concurrently with rapid mixing to maintain the pH at 6.0.+−.0.5. The pH was controlled by the relative rates of addition of Solution I and Solution II. A silicone defoamer ANTIFOAM 289 available from Sigma chemical was added in 5-300 ppm to suppress foaming during precipitation. The addition took about one hour, after which the resulting slurry was vacuum filtered using Number 50 Whatman filter paper. The filter cake was washed thoroughly twice by reslurrying in portions in a Waring blender for two minutes at medium speed with a total volume of 100 mL of deionized water followed by vacuum filtering. The filter cake was dried at 162° C. in a convection oven overnight. Samples were ground to −100 mesh and tested for productivity.

50 mg of the above sample was further tested in a 1 inch quartz tube reactor. The tube reactor was quickly heated to 680° C. in an Argon stream to purge the reactor after which the gas stream was switched to a mixture of hydrogen and ethylene at a flow rate of 400 and 200 mL/min under standard conditions. The reactor was maintained at temperature for the about 20 minutes, after which the reactor was cooled in argon and emptied. The yield based on catalyst is 7 and the yield based on iron content is 140. The ratio of SWNTs to MWNTs is approximately 1/10.

The terms and expressions which have been employed are used as terms of description and not of limitations, and there is no intention in the use of such terms or expressions of excluding any equivalents of the features shown and described as portions thereof, it being recognized that various modifications are possible within the scope of the invention.

We claim:

1. A mixed structure of single walled and multiwalled nanotubes, comprising:
    a plurality of single walled nanotubes and multiwalled nanotubes,
    wherein the single walled nanotubes have predominantly hydrophobic surfaces,
    wherein the multiwalled nanotubes have primarily hydrophilic surfaces, and
    wherein the single walled nanotubes and the multiwalled nanotubes form a mixed structure of an interpenetrated single walled and multiwalled nanotube network, further comprising:
        cross-links between a plurality of the single walled nanotubes and a plurality of the multiwalled nanotubes.

2. The mixed structure of claim 1, wherein the mixed structure comprises a calcined structure of interpenetrating oxidized multiwalled nanotubes and single walled nanotubes.

3. A method of making the mixed structure of claim 1, wherein the method comprises:
    forming a single walled nanotube structure; and
    growing multiwalled nanotubes within the single walled nanotube structure.

4. The method of claim 3, wherein the method comprises:
    providing catalyst particles within the single walled nanotube structure, wherein the multiwalled nanotubes grow from the catalyst particles within the single walled nanotube structure.

5. The mixed structure of claim 1, wherein the mixed structure comprises a rigid, porous structure.

6. A method of making the mixed structure of claim 1, wherein the method comprises:
    providing single walled nanotubes and multiwalled nanotubes, wherein at least a portion of the single walled nanotubes, multiwalled nanotubes, or a combination thereof comprise surface oxygenated groups; and
    calcining the single walled nanotubes and the multiwalled nanotubes to form the cross-links between the single walled nanotubes, the multiwalled nanotubes, or the combination thereof.

7. The mixed structure of claim 1, wherein the mixed structure comprises a ratio of single walled nanotubes to multiwalled nanotubes of 1:100 to 10:1 by weight.

8. The mixed structure of claim 1, wherein the mixed structure comprises a ratio of single walled nanotubes to multiwalled nanotubes of 1:10 to 1:1 by weight or 1:1 to 10:1 by weight.

9. The mixed structure of claim 1, wherein the mixed structure has a density of 0.05 to 0.5 g/mL and/or a surface area of 500 sqm/g to 1000 sqm/g.

10. The mixed structure of claim 1, wherein the mixed structure comprises rigid particles containing interpenetrating single and multiwalled nanotubes.

11. A method of forming the mixed structure of claim 10, wherein the rigid particles are formed by:
    suspending at least a portion of the plurality of multiwalled nanotubes in a first liquid to form a suspension;
    dispersing the plurality of single walled nanotubes in a second liquid to form a dispersion;
    mixing the suspension and the dispersion to form an interpenetrated single walled and multiwalled nanotube network mixture;
    filtering the mixture;
    extruding the mixture to form one or more strands;
    cutting the one or more strands to form cut strands; and
    calcining one or more of the cut strands.

12. A mixed structure of single walled and multiwalled nanotubes, comprising:
    a plurality of single walled nanotubes and multiwalled nanotubes,
    wherein at least a portion of the single walled nanotubes or the multiwalled nanotubes are bundled, and the bundles include particles,
    wherein the single walled nanotubes have predominantly hydrophobic surfaces,
    wherein the multiwalled nanotubes have primarily hydrophilic surfaces, and
    wherein the single walled nanotubes and the multiwalled nanotubes form an interpenetrated single walled and multiwalled nanotube network,. further comprising:
        cross-links between a plurality of the single walled nanotubes and a plurality of the multiwalled nanotubes.

13. The mixed structure of claim 12, wherein the particles comprise a catalyst.

14. The mixed structure of claim 13, wherein the catalyst comprises Pt or Pd.

15. A method of making the mixed structure of claim 12, wherein the method comprises:
   forming a single walled nanotube structure from at least a portion of the single walled nanotubes;
   providing particles to the single walled nanotube structure;
   growing the multiwalled nanotubes within the single walled nanotube structure from the particles provided to the single walled nanotube structure, and
   cross-linking a plurality of the single walled nanotubes with a plurality of the multiwalled nanotubes.

* * * * *